UNITED STATES PATENT OFFICE.

HANS BARDT, OF SANTIAGO, CHILE, ASSIGNOR TO SOCIEDAD HIDRO-METALURGICA, OF SANTIAGO, CHILE, A CORPORATION OF CHILE.

PROCESS FOR DISSOLVING OR RECOVERING METALS.

1,423,069. Specification of Letters Patent. Patented July 18, 1922.

No Drawing. Application filed September 17, 1921. Serial No. 501,418.

*To all whom it may concern:*

Be it known that I, HANS BARDT, citizen of Germany, residing at Santiago, Chile, have invented certain new and useful Improvements in Processes for Dissolving or Recovering Metals, of which the following is a specification.

The subject of the invention is a process for directly recovering or dissolving the metals contained in ore, matte, metalliferous residues, waste and alloys by electrolysis.

Up to the present, copper ore or cupriferous waste, for instance, were treated in the following manner:

The cupriferous material, in some cases after preliminary concentration, etc. (in the case of certain ores, residues or waste, after being formed into briquettes) was melted down and reduced in a shaft furnace with coke and adequate fluxes, with a view of producing, in the case of copper ore, first raw and concentrated matte and finally, (and in the case of treating cupriferous waste or residues, immediately) black copper. The black copper obtained in this manner in the shaft furnace was then preliminarily refined in reverberatory or cupola furnaces, shaped into anodes and definitely refined by electrolysis.

Another way of treatment was a leaching method and consisted in giving to the ore or metalliferous material an oxidizing roast, leaching the roasted product with sulphuric acid and precipitating the copper from the solution, thus obtained, by electrolysis.

There were also other propositions of partially roasting the ore, leaching the roasted product with adequate solvents, as f. i. ferric sulphate, cupric chloride in brine, and electrolyzing the solution, thus obtained, using diaphragms and insoluble anodes.

Another method proposed was treating copper ore in the presence of manganese dioxide in a digestor vessel with a current of heated air whereby the copper compounds are supposed to be converted into sulphates. In case it should be found necessary the hot air could be introduced under pressure.

A special disadvantage of the last-mentioned procedure is the impossibility of completely regenerating the manganese dioxide, considerable quantities of this substance being lost, and also the necessity of heating the air implies a considerable consumption of fuel, which makes the whole process expensive.

By extensive experiments it has been proved that it is possible, without applying heat from without, to dissolve, completely and within a few hours, the copper contained in ore, cupriferous waste and alloys by means of sulphuric acid of so small a degree of concentration as corresponds to a copper content of 10 per cent at normal temperature, adding such equivalent quantities of nitric acid as are required to oxidize the copper which is to be dissolved, if the dissolving process is performed by applying accelerating agents or methods.

This acceleration can be achieved by operating under a pressure of several atmospheres in a leaching vessel completely which is closed or by adding an adequate catalyzer to the solvent or by applying both methods together.

Catalyzers which have proved suitable, for the afore-mentioned purpose, are platinum and also salts of metals with various stages of oxidation, as f. i. vanadium, osmium, cerium and manganese compounds. It will be advisable to dissolve the copper from the respective cupriferous substances combining both methods of acceleration, i. e., to operate under high pressure using at the same time a catalyzer within the solution. The vapours of nitrogen dioxide which are produced during the reaction, are regenerated in the usual manner to nitric acid which is used over again in the following dissolving process. The solution of copper sulphate is electrolyzed by using insoluble anodes, in order to precipitate the copper, when the equivalent quantity of free diluted sulphuric acid (which is liberated by the electrolysis) is re-introduced in the pressure vat in order to dissolve further quantities of copper.

It is convenient to perform the electrolysis directly in the dissolving vessel, in order to produce the pressure necessary for starting the reaction by means of the oxygen which is liberated at the anode and so as to be able to carry out the entire process in one operation.

The following examples will serve to illustrate the process.

I. To a certain quantity of cupriferous waste, so as to correspond to a total content of 1000 grammes of copper, three liters of sulphuric acid (15.4% strength) are added, then 940 cubic-centimeters of nitric acid (36° Baumé) are poured into the vessel, and finally, 7 liters of sulphuric acid (15.4% strength) are added, the latter containing a suitable catalyzer, f.i., 5 milligrammes of tetroxide of osmium or about 1% of sulphate of manganese. The vessel in which the dissolving process is performed should be covered with an insulating material, as f.i., kieselguhr, saw-dust, etc., in order to prevent heat-radiation. After some 5 to 7 hours, the copper is nearly completely dissolved and the sulpuhric acid approximately neutralized.

II. After having determined the proportion required of the different substances and re-agents, following the procedure of the Example No. I, the dissolving process is performed in an autoclave insulated against heat radiation.

In order to start the reaction, a pressure of about 1.5 atmospheres is produced by means of electrolysis with insoluble anodes whereby gas is liberated.

From this moment, it takes about two hours (in case of adding a catalyzer as in Example No. I, it takes more or less one hour) until the copper is dissolved and combined with the sulphuric acid.

By the term "rare earths," employed in the claims, I mean the elements vanadium, osmium and cerium, as above set forth in the specification.

Claims—

1. An electrolytic process of extracting metals from ores, matte, cupriferous waste and alloys, which comprises subjecting the metal containing materials to the action of a solution containing sulphuric and nitric acids in the presence of a catalyzer and under pressure, the pressure being formed by the electrolyzing of the said solution in a closed container.

2. An electrolytic process of precipitating copper from copper bearing ores, matte, cupriferous waste and alloys which comprises subjecting the copper containing material to the action of a solution containing sulphuric and nitric acids and a catalyzer, and electrolyzing the solution to precipitate the metal as the metal containing material is dissolved, said process being carried on under pressure caused by the electrolyzing of the said solution in a closed container.

3. In the process of extracting copper from ores, matte, cupriferous waste and alloys, the steps which consist of treating the copper containing material with a solution of sulphuric and nitric acids and in the presence of platinum catalyst electrolyzing the said mixture whereby the copper is precipitated.

4. The process as set forth in claim 3 wherein the catalyst consists of a manganese compound.

5. The process as set forth in claim 3, wherein the catalyst consists of a compound of a rare earth element.

In testimony whereof I affix my signature.

HANS BARDT.

Witnesses:
   WALTER J. TINGLE,
   R. E. CARNUTTER.